Feb. 21, 1950        W. B. ELMER        2,498,259
THERMOSTATICALLY ACTUATED CONTROL SYSTEM
Filed Feb. 22, 1945        2 Sheets-Sheet 1
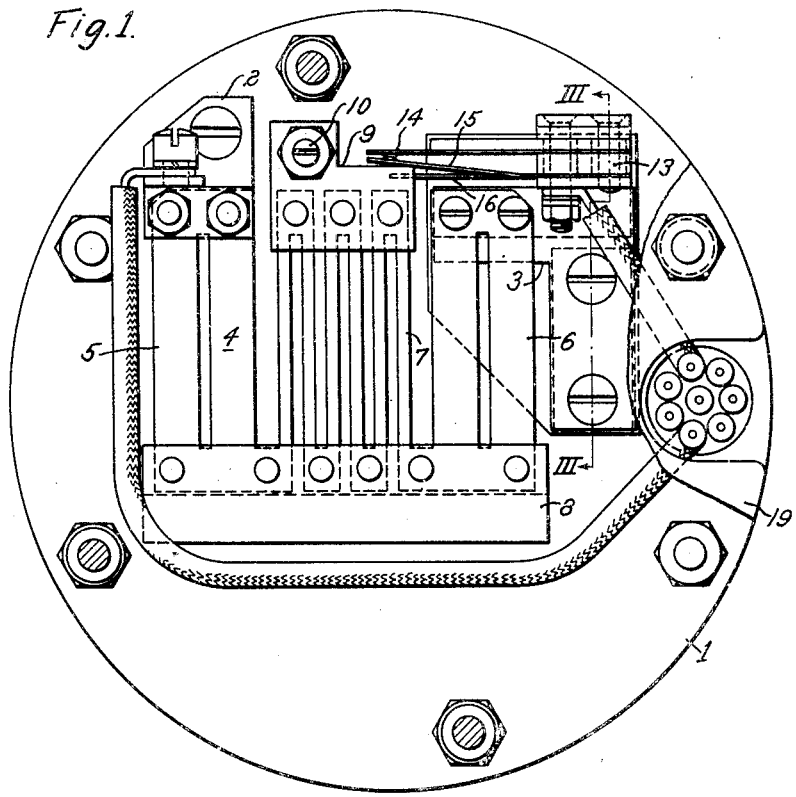
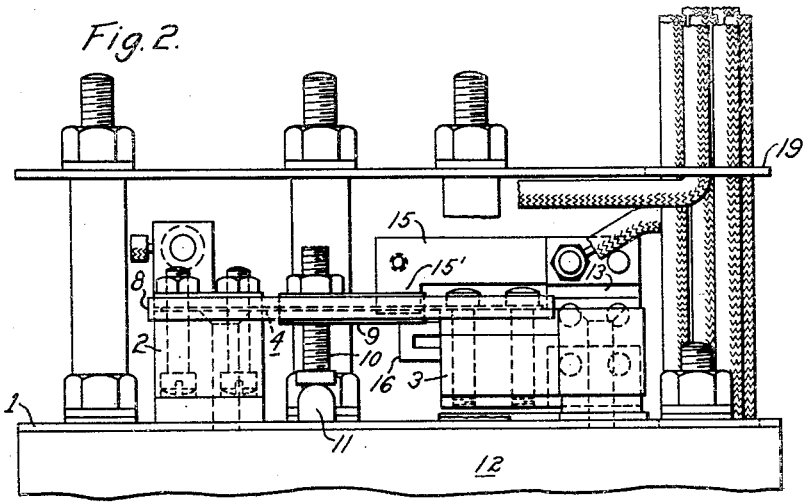
WITNESS:
Wm. B. Sellers.
INVENTOR
William B. Elmer.
BY
Paul E. Friedemann
ATTORNEY Feb. 21, 1950 W. B. ELMER 2,498,259
THERMOSTATICALLY ACTUATED CONTROL SYSTEM
Filed Feb. 22, 1945 2 Sheets-Sheet 2
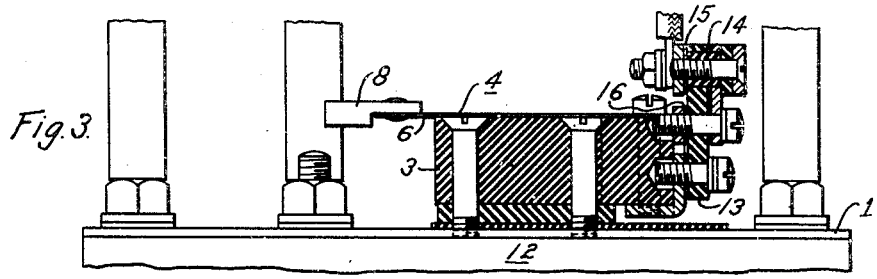
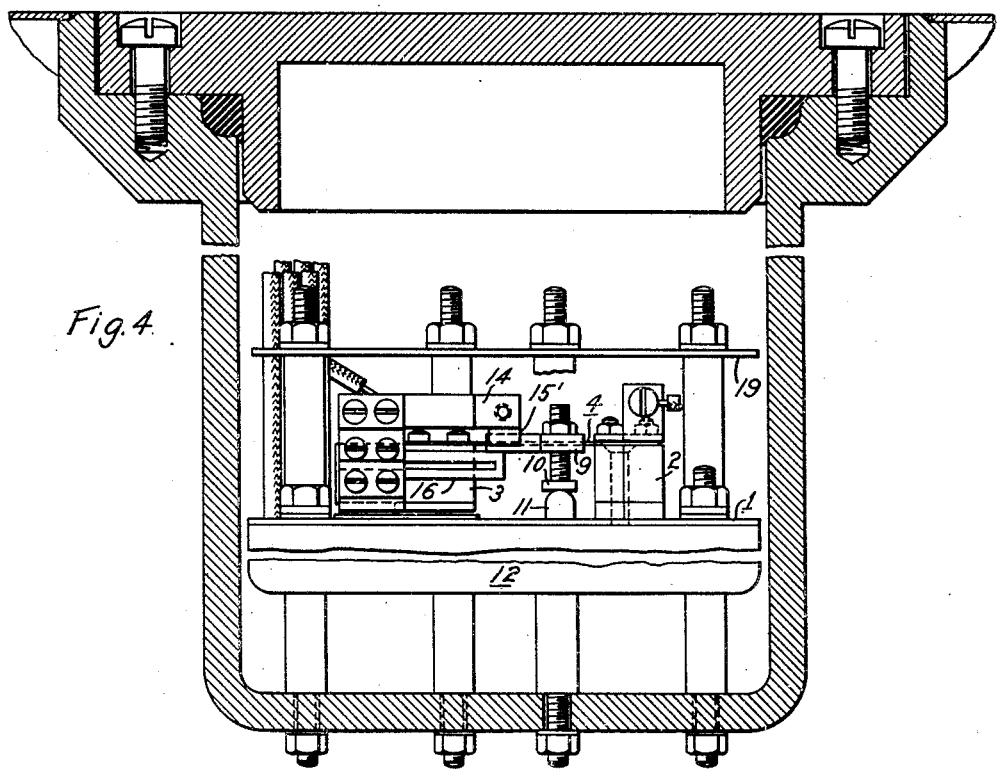
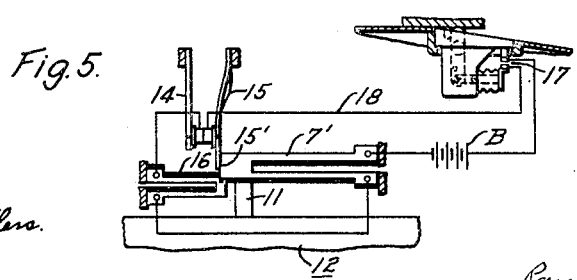
WITNESS:
Wm. B. Sellers.
INVENTOR
William B. Elmer.
BY
Paul E. Friedemann
ATTORNEY Patented Feb. 21, 1950

2,498,259

UNITED STATES PATENT OFFICE 2,498,259

THERMOSTATICALLY ACTUATED CONTROL SYSTEM

William B. Elmer, Lakewood, Ohio, assignor to Westinghouse Electric Corporation, East Pittsburgh, Pa., a corporation of Pennsylvania Application February 22, 1945, Serial No. 579,230

10 Claims. (Cl. 60—23)

My invention relates to thermostatically controlled devices, and more particularly to thermostatic devices for controlling the operation of mechanisms.

The Government of the United States has been granted a certain royalty-free license for governmental purposes with respect to the invention herein described.

In the electric torpedo that has come into general use during the present war, there are devices, as clock mechanisms, that must be set in operation a given time after the torpedo is fired and still other devices controlled by the clock mechanism that operate in time sequence after the torpedo is under way on its own power. Heretofore hydrostatic means have been in vogue to set a spring wound clock in operation. Such hydrostatic devices are not reliable since any shocks, if of sufficient magnitude, will set the clock in operation. Further, such devices are complicated, expensive and worst of all require a mounting at an opening in the housing of the torpedo in such manner that the pressure responsive devices within the torpedo are subject to the pressure of the sea water. The environment of my invention is not limited to a torpedo but my invention has general utility, as the objects set forth and the claims presented indicate.

One broad object of my invention is the modification of the invention of mine, disclosed and claimed in my prior Patent No. 2,284,383, entitled Thermostatic control device, issued May 26, 1942, to make it shockproof and self-locking.

Another broad object of my invention is the provision of shockproof thermostatic control for a mechanism, as a clock relay, or any other mechanism.

A further object is to provide an improved compensating thermostatic motor element that is normally locked against operation in an unoperated position until subjected to a given heating effect and thereafter locked in its operated position to thus effect continued control of some mechanism.

A more specific object of my invention is to provide an improved ambient temperature compensated thermostatic motor element that is locked in a non-operated position during all changes in ambient temperature, is subjected to heating, is unlocked when subjected to a predetermined change in temperature over the ambient temperature because of such heating to thus permit movement of the motor element to an operated position, is locked in its operated position once having moved to such position, and is thereafter no longer subjected to heating.

Other objects and advantages will become more apparent from a study of the following specification and the accompanying drawings, in which:

Figure 1 is a plan view of my thermostatic structure with most of cover broken away, Fig. 2 is a front view illustrating structural features of the thermostatic structure shown in Fig. 1, Fig. 3 is a side view with parts broken away along section line III—III of Fig. 1 looking in the direction indicated by the arrows at the end of the section line;

Fig. 4 is a view from the rear of my thermostatic structure showing the structure in the relation it may occupy in the body of a torpedo; and Fig. 5 is a schematic showing of my thermostatic structure in combination with an electric circuit for heating the thermostatic elements of the structure.

Referring to the figures of the drawings, I designates the base upon which are mounted blocks of insulating material 2 and 3 for rigidly securing the plate-like thermostat 4 to the base 1. A cover 19 is disposed above the various elements to be presently described to guard against mechanical injury of the elements. The thermostat 4 is generally in the shape of a rectangular plate and in the manufacture is actually stamped from a single plate of thermostatic metal, the stamping being in such manner that the thermostat has two side or outer strips 5 and 6 of considerably greater width than the strip 7 cut into the shape of a resistance grid. The outer strips 5 and 6 have their rear ends rigidly secured to the insulating blocks 2 and 3, respectively, with the front end or lower end, as seen in Fig. 1, being projected outwardly from the blocks of insulating material in the form of cantilever beams. At the front ends of the strips 5, 6 and 7, a relatively rigid strap 8 of insulating material rigidly secures all the strips together so that strips 5, 6 and 7 always project from this insulating strap 8 in the same direction.

The rear end of the grid-like strip 7, as shown in Fig. 1, consists of three rearwardly projecting ends rigidly connected together to an insulating block 9 carrying the adjustable screw 10 for actuating the button 11 of the spring wound clock 12. It will be noted that with the construction just described, the thermostatic strips being secured to each other in the manner designated will always fall in the same cylindrical surface so long as the temperature to which the respective strips are subjected are not different in magnitude. I, therefore, provide a very effective thermostatic structure for compensating for changes in ambient temperature because ambient temperature will cause the strips 5, 6 and 7 to deflect equal amounts so that all the points of the strips will be retained substantially in the same cylindrical surface. In consequence the insulating block 9 and thus the adjustable bolt 10 will remain in a fixed position with reference to the button 11 regardless of any changes in ambient temperature.

A device of the character thus far generally indicated taken by itself is not shockproof, since any impact from the top or the bottom will tend to deflect the free end of the strip 7 and thereby may actuate the button 11. To gain a better understanding of the structures hereinafter described as forming part of the combination of this invention, a brief discussion of the use to which my device is to be put will be helpful.

The general use of the electric torpedo requires the operation of certain timing mechanisms after firing of the torpedo. Heretofore, the hydrostatic device used required the mounting of the hydrostatic device in the torpedo at the region of a hand-hole or similar opening in the torpedo so that a diaphragm responsive to the pressure of the sea water would be exposed to the sea water to thus actuate a clock, as 12, by depressing a button as 11.

Such devices involve considerable mechanical complexity both in their own structure as well as in the structure of the torpedo and are not shockproof. To avoid the use of the hydrostatically operated devices, I have modified my thermostatic structure, shown, described and claimed in my above mentioned patent, so that it is both shockproof, assures the continued operation of a mechanism set in operation by it, and is self-deenergizing once it has been operated from a non-operated position to an operated position. To accomplish these additional functions, the block of insulation 3 is provided with an extension at the rear having an upwardly projecting portion 13. On this upwardly projecting portion, I mount the two contacts 14 and 15, both contact members 14 and 15 being in the shape of flat springs disposed in generally vertical planes with contact 15 being disposed under pressure so that a portion thereof abuts the rear end of the strip 7, namely abuts against the block of insulating material 8 carrying the adjustable bolt 10. Both contacts are secured to the projection 13 at the right to thus project as cantilever beams toward the left but above strips 6 and 7. The deflection of spring contact 15 is sufficient to close the contacts 14 and 15 to thus close one portion of a circuit to be hereinafter discussed. The left end of contact 15 has a downwardly projecting portion 15' so disposed with reference to block 9 in the event block 9 is moved downwardly a sufficient distance to actuate the button 11, it will also permit the spring 15 to deflect towards the front so that the downwardly projecting portion 15' moves on top of block 9, thereby permanently locking the strip 7 in its operated position to thus thereafter permanently hold button 11 down. The clock 12 will, therefore, continue to operate once set in operation.

To prevent downward deflection of the free end of the strip 7, except when desired, a hairpin type of a bimetallic thermostat 16 is secured on the vertical surface of the lower rear end of the block of insulation 3. The thermostat is thus disposed with its width in a vertical plane. Normally, the left-hand end of the thermostat 16 is disposed under the block of insulation 9 so that any shocks applied to the base from below will not, by virtue of the inertia of the strips 5, 6 and 7 and the blocks of insulation 8 and 9, actuate the button 11. The thermostat 16 when subjected to a sufficient amount of heating will deflect toward the rear or in a clockwise direction, as seen in Fig. 1, with the result that it will, once deflected, no longer prevent any vertical movement of the rear end of the strip 7.

Both the contact strip 15 as well as the thermostat 16 need not necessarily be devised to lock the rear end only against vertically downward movement as thermostat 16 would do before being heated, or against vertically upward movement as contact 15 would do once the free end is moved to its operating position. The arrangement may be such as to prevent any vertical movements, except when desired. The showing made will, however, suffice for the illustration of the principle of operations accomplished by the contact strip 15 and the thermostat 16.

To effect the appropriate operation of my thermostatic structure in a torpedo, I provide a source of electrical energy indicated by the battery B connected in series with a trigger switch 17 actuated to closed position upon firing of the torpedo. When the trigger switch is closed a circuit is established from the battery B through trigger switch 17, conductor 18, spring contacts 15 and 14, the hairpin type thermostat 16, the strips 6, 7 and 5 in the order named back to the battery B. The strips 5, 6 and 7 are merely shown schematically by the single strip 7' indicated in Fig. 5. Upon the firing of the torpedo, contacts of the trigger switch 17 close whereupon the circuit recited becomes energized and since the grid portion of the thermostatic structure, namely strip 7, is of considerably greater resistance per unit length than the strips 5 and 6, strip 7 will become unequally heated with reference to strips 5 and 6 and in consequence the free end carrying the block of insulation 9 will be deflected downwardly to actuate the clock starting button 11. However, such actuation cannot take place except when the thermostat element 16 is sufficiently deflected to move from under the block 9. The selection of thermostat 16 is such that but a few seconds are required, after the electric current traverses the thermostat 16, for it to deflect sufficiently to release block 9 for movement in the downward direction. As a matter of fact, the selection is normally so made that the deflection of thermostat 16 precedes the deflection of the free or rear end of the strip 7, so that there will be no opportunity for any binding action between the thermostat 16 and block 9.

The instant the rear or free end of the strip 7 has moved a sufficient distance to actuate the button 11, the spring contact 15 will move over the top of the block of insulation 9 and the downwardly projecting end 15' will prevent any further upward movement of this block, thereby permanently holding the starting button 11 in the actuated position.

At the same time that the contact 15 moves to lock the free or rear end of the strip 7 in its operated position, contact 15 is moved away from contact 14 to break the circuit heretofore traced with the result that not only is the clock mechanism set in operation and maintained in operation but the thermostatic elements are disconnected from the source of electrical energy to prevent any over-heating of these elements.

While I have shown and described but one embodiment of my invention, it is apparent that others particularly after having had the benefit of the teachings of my invention may devise other possibly similar constructions for accomplishing the same result. I therefore, do not wish to be limited to the particular showing herein made, but wish to be limited only by the scope of the claims hereto appended.

I claim as my invention:

1. In a thermostatically actuated control system, a thermostatic responsive structure comprising at least two coextending spaced apart flat strips in side by side relation and capable of lying in the same cylindrical surface, means rigidly joining one pair of adjacent ends of the strips to each other, a base, means rigidly securing the other end of one of the strips to the base, the other end of the second strip, lying adjacent the other end of the first strip, being free to move relative to the base in response to unequal heating of said two spaced apart strips, means mounted on the base and biased against the said other end of the second strip to thus move along and over the cylindrical surface of the said other end of the second strip upon a predetermined movement of the said other end of the second strip with reference to the base to thus retain the other end of the second strip in the position determined by the predetermined movement, and means actuated by said other end of the second strip by the said predetermined movement thereof.

2. In a thermostatically actuated control system, a thermostatic responsive structure comprising at least two coextending spaced apart flat strips in side by side relation and capable of lying in the same cylindrical surface, means rigidly joining one pair of adjacent ends of the strips to each other, a base, means rigidly securing the other end of one of the strips to the base, the other end of the second strip, lying adjacent the other end of the first strip, being free to move relative to the base in response to unequal heating of said two spaced apart strips, means mounted on the base and biased against the said other end of the second strip to thus move along and over the cylindrical surface of the said other end of the second strip upon a predetermined movement of the said other end of the second strip with reference to the base to thus retain the other end of the second strip in the position determined by the predetermined movement, a thermostatic element disposed to hold the other end of the second strip in its initial position, namely within the cylindrical surface the said other end of the second strip occupies when the strips are not subject to unequal heating, but adapted to release the other end of the second strip when the strips are subject to unequal heating, and means actuated by said other end of the second strip by the said predetermined movement thereof.

3. In a thermostatically actuated control system, a thermostatic responsive structure comprising at least two coextending spaced apart flat strips in side by side relation and capable of lying in the same cylindrical surface, means rigidly joining one pair of adjacent ends of the strips to each other, a base, means rigidly securing the other end of one of the strips to the base, the other end of the second strip, lying adjacent the other end of the first strip, being free to move relative to the base in response to unequal heating of said two spaced apart strips, means for latching the other end of the second strip in a given position upon deflection of the other end of the second strip to said given position, means for retaining the other end of the second strip in its initial position but adapted to release it upon unequal heating of the strips, and means actuated by said other end of the second strip by the said predetermined movement thereof.

4. In a thermostatically actuated control system, a thermostatic responsive structure having coextensive spaced apart portions in side by side relation and capable of lying in the same cylindrical surface, means rigidly joining one pair of adjacent ends of said portions together, a base, means rigidly supporting the other end of one of said portions on the base, means disposed in the path of the other end of the second portion to be operated by movement of said other end of the second portion upon unequal heating, a thermostatic latch fixed on the base and having an element normally engaging the other end of the second portion to hold it in a given position but adapted to release the other end of the second portion upon unequal heating of the portions, and means for locking the other end of the second portion in the position to which it is moved upon unequal heating of the portions.

5. In combination with a mechanism to be set in operation, a thermostatic structure comprising the combination of, a pair of substantially coextensive spaced apart strips of thermostatic material disposed in side by side relation so that the strips lie substantially in the same cylindrical surface and corresponding ends lie adjacent each other, means for rigidly connecting one pair of adjacent ends of the strips together, a base, means for fixing the other end of one of the strips to the base, whereby the other end of the second strip, constituting a free end, is free to move with reference to the base upon subjecting the thermostatic strips to unequal heating, means mounted on the free end to operate said mechanism, and a flat spring at one end rigidly mounted on the base with its loose end disposed with a biasing force against the free end of the second strip, whereby the loose end moves to one side of the cylindrical surface occupied by the free end of the strip upon a predetermined movement of the free end.

6. In combination with a mechanism to be set in operation, a thermostatic structure comprising the combination, of a pair of substantially coextensive spaced apart strips of thermostatic material disposed in side by side relation so that the strips lie substantially in the same cylindrical surface and corresponding ends lie adjacent each other, means for rigidly connecting one pair of adjacent ends of the strips together, a base, means for fixing the other end of one of the strips to the base, whereby the other end of the second strip, constituting a free end, is free to move with reference to the base upon subjecting the thermostatic strips to unequal heating, means mounted on the free end to operate said mechanism, a flat spring at one end rigidly mounted on the base with its loose end disposed with a biasing force against the free end of the second strip, whereby the loose end moves to one side of the cylindrical surface occupied by the free end of the strip upon a predetermined movement of the free end, and a third thermostatic strip at one end fixed to the base and disposed generally in the plane of the flat spring and cooperatively engaging the free end of the second strip to prevent movement of the free end of the second strip except upon a predetermined unequal heating of the pair of coextensive spaced apart strips.

7. In combination with a mechanism to be set in operation, a thermostatic structure comprising the combination of; a pair of substantially coextensive spaced apart strips of thermostatic material disposed in side by side relation so that the strips lie substantially in the same cylindrical surface and corresponding ends lie adjacent each other, means for rigidly connecting one pair of adjacent ends of the strips together; a base, means for fixing the other end of one of the strips to the base, whereby the other end of the second strip, constituting a free end, is free to move with reference to the base upon subjecting the thermostatic strips to unequal heating; means mounted on the free end to operate said mechanism, a flat spring at one end rigidly mounted on the base with its loose end disposed with a biasing force against the free end of the second strip, whereby the loose end moves to one side of the cylindrical surface occupied by the free end of the strip upon a predetermined movement of the free end, a third thermostatic strip at one end fixed to the base and disposed generally in the plane of the flat spring and cooperatively engaging the free end of the second strip to prevent movement of the free end of the second strip except upon a predetermined unequal heating of the pair of coextensive spaced apart strips, and electric means connected in series with said strips to electrically heat the strips.

8. In combination with a mechanism to be set in operation, a thermostatic device comprising a thermostatic composite metal plate having at the mid portion of the plate a series of slits alternately extending to near the opposite edges of the plate to thus define three parallelly disposed strips with the strip at the mid portion forming a grid of relatively higher electrical resistance per unit length than the two outside wider strips, a base means for securing the rear ends of the wider strips to the base, means rigidly securing the front ends of the three strips together, means rigidly connecting the plurality of rear grid portions of the middle strip together to provide a single rear free end for the grid portion, locking means at the rear free end of the middle strip for locking the free rear end against movement after a predetermined movement of the said free rear end with reference to the base, electric mans for unequally heating the strips to cause said predetermined movement of the said rear free end, and means associated with said rear free end for starting said mechanism.

9. In combination with a mechanism to be set in operation, a thermostatic device comprising a thermostatic composite metal plate having at the mid portion of the plate a series of slits alternately extending to near the opposite edges of the plate to thus define three parallelly disposed strips with the strip at the mid portion forming a grid of relatively higher electrical resistance per unit length than the two outside wider strips, a base means for securing the rear ends of the wider strips to the base, means rigidly securing the front ends of the three strips together, means rigidly connecting the plurality of rear grid portions of the middle strip together to provide a single rear free end for the grid portion, locking means at the rear free end of the middle strip for locking the free rear end against movement after a predetermined movement of the said free rear end with reference to the base, thermostatic means for locking said rear free end against movement, and electric means for heating said thermostatic means to release said rear free end and for unequally heating the strips to cause said predetermined movement of the said rear free end.

10. In combination with a mechanism to be set in operation, a thermostatic device comprising a thermostatic composite metal plate having at the mid portion of the plate a series of slits alternately extending to near the opposite edges of the plate to thus define three parallelly disposed strips with the strip at the mid portion forming a grid of relatively higher electrical resistance per unit length than the two outside wider strips, a base means for securing the rear ends of the wider strips to the base, means rigidly securing the front ends of the three strips together, means rigidly connecting the plurality of rear grid portions of the middle strip together to provide a single rear free end for the grid portion, locking means at the rear free end of the middle strip for locking the free rear end against movement after a predetermined movement of the said free rear end with reference to the base, thermostatic means for locking said rear free end against movement, and electric means for heating said thermostatic means to release said rear free end and for unequally heating the strips to cause said predetermined movement of the said rear free end, and means operated by said locking means to effect discontinuance of any heating of the strips and thermostatic means after said predetermined movement of the free rear end.

WILLIAM B. ELMER.

REFERENCES CITED

The following references are of record in the file of this patent:

UNITED STATES PATENTS

| Number | Name | Date |
|---|---|---|
| 1,010,414 | Cubitt | Dec. 5, 1911 |
| 1,652,527 | Hodgkins | Dec. 13, 1927 |
| 1,818,873 | Sweeny | Aug. 11, 1931 |
| 1,947,037 | Daley | Feb. 13, 1934 |
| 2,080,244 | Weirich | May 11, 1937 |
| 2,171,895 | Sardeson | Sept. 5, 1939 |
| 2,284,383 | Elmer | May 26, 1942 |
| 2,302,399 | Stimson | Nov. 17, 1942 |